(12) United States Patent
Young et al.

(10) Patent No.: US 9,015,575 B2
(45) Date of Patent: Apr. 21, 2015

(54) PROPERTY OVERRIDES ON INCLUDED MATERIAL

(75) Inventors: Jeff Young, Grancebellew (IE); John P. Brinkman, Ottawa (CA)

(73) Assignee: Adobe Systems Incorporated, San Jose, CA (US)

( * ) Notice: Subject to any disclaimer, the term of this patent is extended or adjusted under 35 U.S.C. 154(b) by 2170 days.

(21) Appl. No.: 12/029,210

(22) Filed: Feb. 11, 2008

(65) Prior Publication Data

US 2014/0032604 A1    Jan. 30, 2014

(51) Int. Cl.
*G06F 17/24* (2006.01)
*G06F 17/22* (2006.01)

(52) U.S. Cl.
CPC .......... *G06F 17/243* (2013.01); *G06F 17/2229* (2013.01); *G06F 17/2247* (2013.01)

(58) Field of Classification Search
USPC ................................................ 715/234, 235
See application file for complete search history.

(56) References Cited

PUBLICATIONS

Bill Camarda; Special Edition Using Microsoft Office Word 2003; Dec. 12, 2003; Que Publishing; pp. 65-66, 68, 309-331, and 775-777.*

Frank Rice; How to: Manipulate Office Open XML Formats Documents; Dec. 2006; Microsoft Corporation; pp. 1-25.*
"Adobe Xml Architecture: Scripting Object Model Expression Specification Version 2.0", *Adobe Systems Incorporated*, (Oct. 2003),33 pgs.
"Cascading Style Sheets", [Online]. Retrieved from the Internet: <URL: http://en.wikipedia.org/wiki/Cascading_Style_Sheets>, Wikipedia,(Jan. 9, 2008),8 pgs.
"Inheritance (Computer Science)", [Online]. Retrieved from the Internet: <URL: http://en.wikipedia.org/wiki/Inheritance_%28computer_science%29>, Wikipedia,(Jan. 9, 2008),5 pgs.
"Method Overriding (programming)", [Online]. Retrieved from the Internet: <URL: http://en.wikipedia.org/wiki/Override_%28object-oriented_programming%29>, Wikipedia,(Jan. 9, 2008),2 pgs.
"Server Side Include Commands", [Online]. Retrieved from the Internet: <URL: http://www.w3.org/Jigsaw/Doc/User/SSI.html>, (Jan. 9, 2008),8 pgs.
"XFA", [Online]. Retrieved from the Internet: <URL: http://en.wikipedia.org/wiki/XFA>, (Jan. 9, 2008),1 pg.

* cited by examiner

*Primary Examiner* — Andrew Dyer
(74) *Attorney, Agent, or Firm* — Shook Hardy & Bacon LLP

(57) ABSTRACT

In one example embodiment, a system and method is shown that includes identifying a host setting related to a property of a document data structure and a property of a fragment data structure, the document data structure reflecting an organization of a document, and the fragment data structure reflecting an organization of a portion of the document. Additionally, the system and method may include overriding the property of the fragment data structure using the property of the document data structure, if the host setting includes a command that the property of the fragment data structure is to be overridden by the property of the document data structure.

12 Claims, 14 Drawing Sheets

FIG. 4
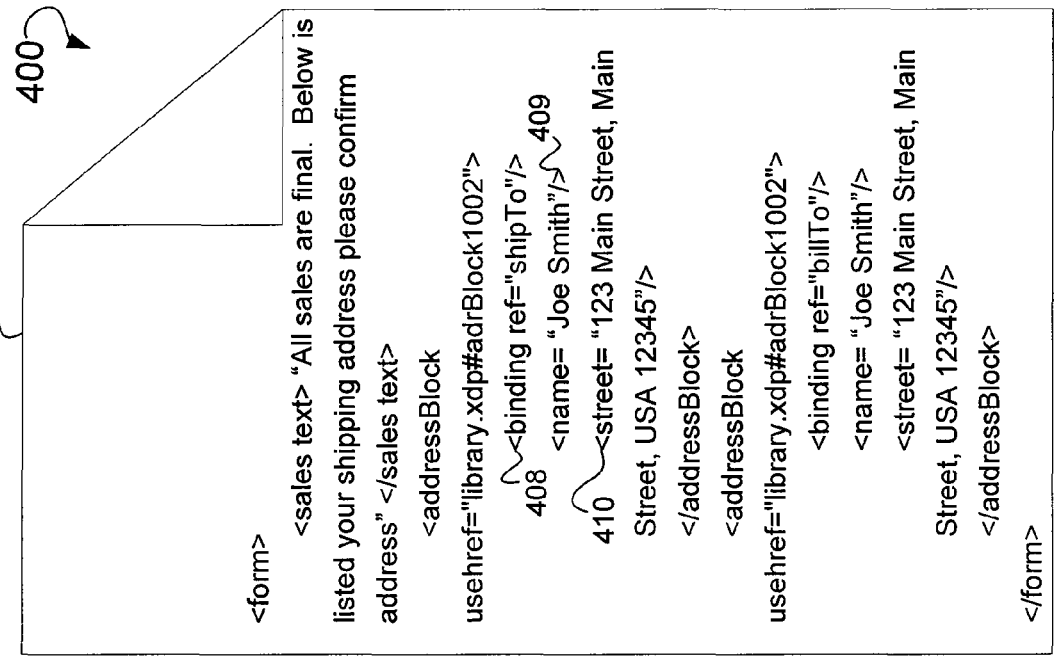
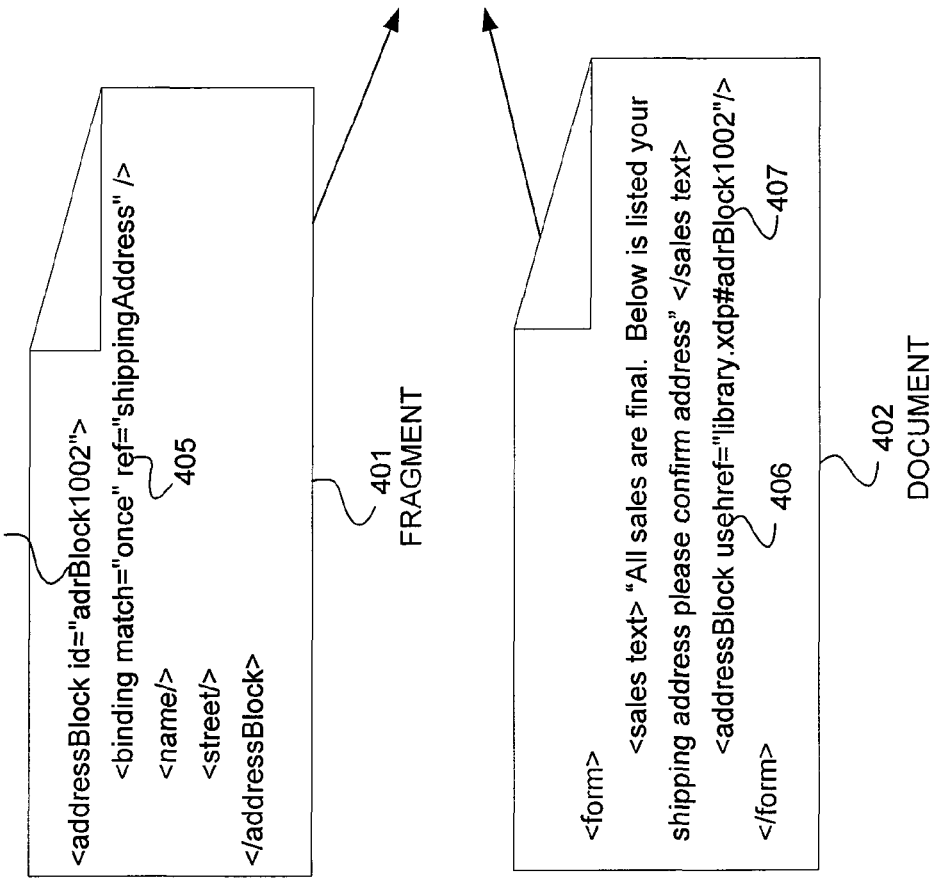

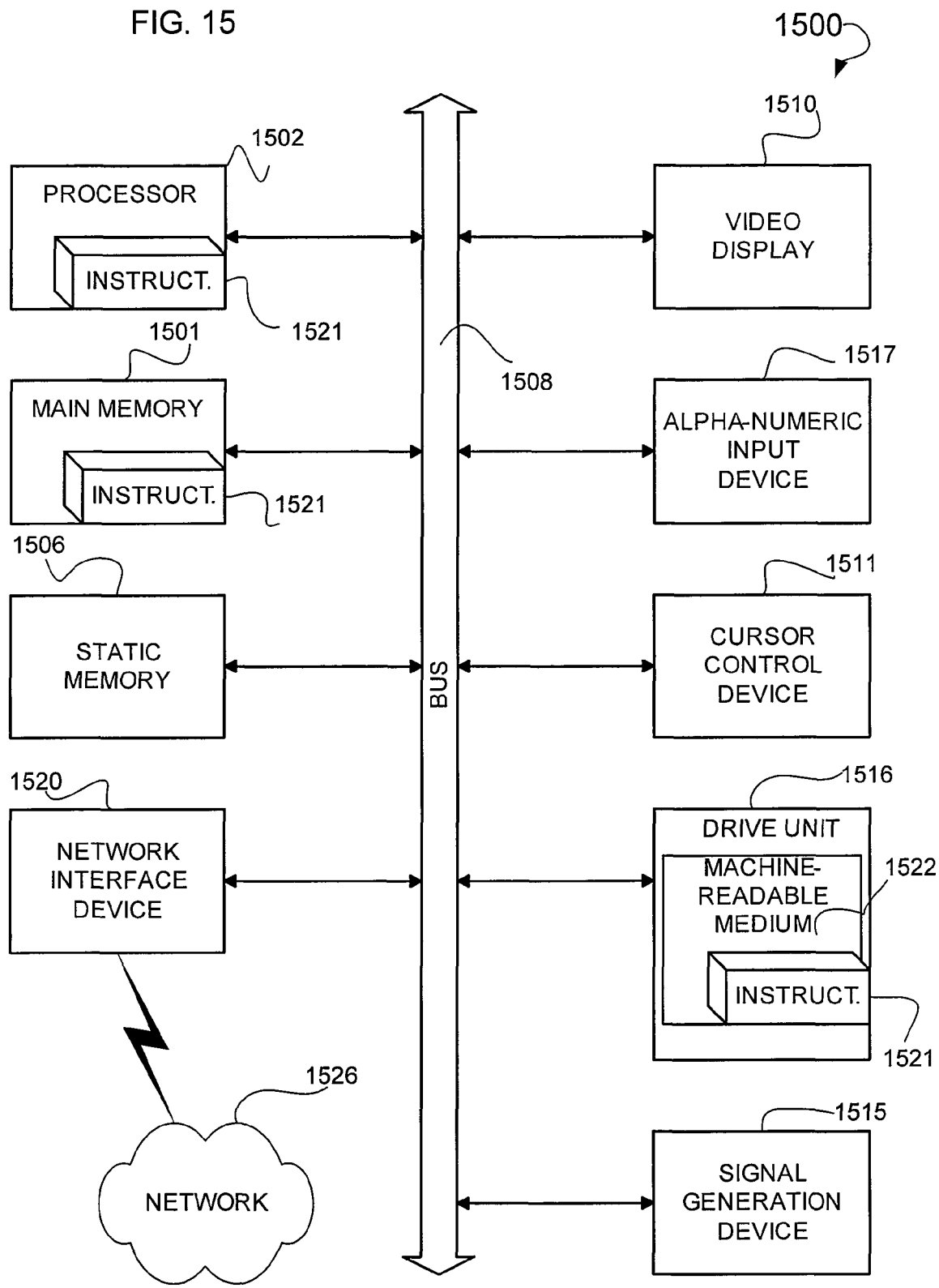

PROPERTY OVERRIDES ON INCLUDED MATERIAL

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be illustrated below and in the drawings that form a part of this document: Copyright© 2008, Adobe Systems Incorporated. All Rights Reserved.

TECHNICAL FIELD

The present application relates generally to the technical field of algorithms and programming and, in one specific example the display of editable text fields in a document.

BACKGROUND

An eXtensible Markup Language (XML) is a general-purpose markup language. In some cases, families of XML based specifications have been developed to perform a number of functions relating to the sharing of structured data. These families include the XML Forms Architecture (XFA). XFA may be used to format documents, and more specifically to format data fields within documents. These documents may be text document such as online forms containing fields that a user may fill in.

BRIEF DESCRIPTION OF THE DRAWINGS

Some embodiments are illustrated by way of example and not limitation in the figures of the accompanying drawings in which:

FIG. 4 is a diagram of a final document, according to an example embodiment, illustrating the override of certain fragment properties.

FIG. 15 shows a diagrammatic representation of a machine in the example form of a computer system, according to an example embodiment.

DETAILED DESCRIPTION

Figure 1:
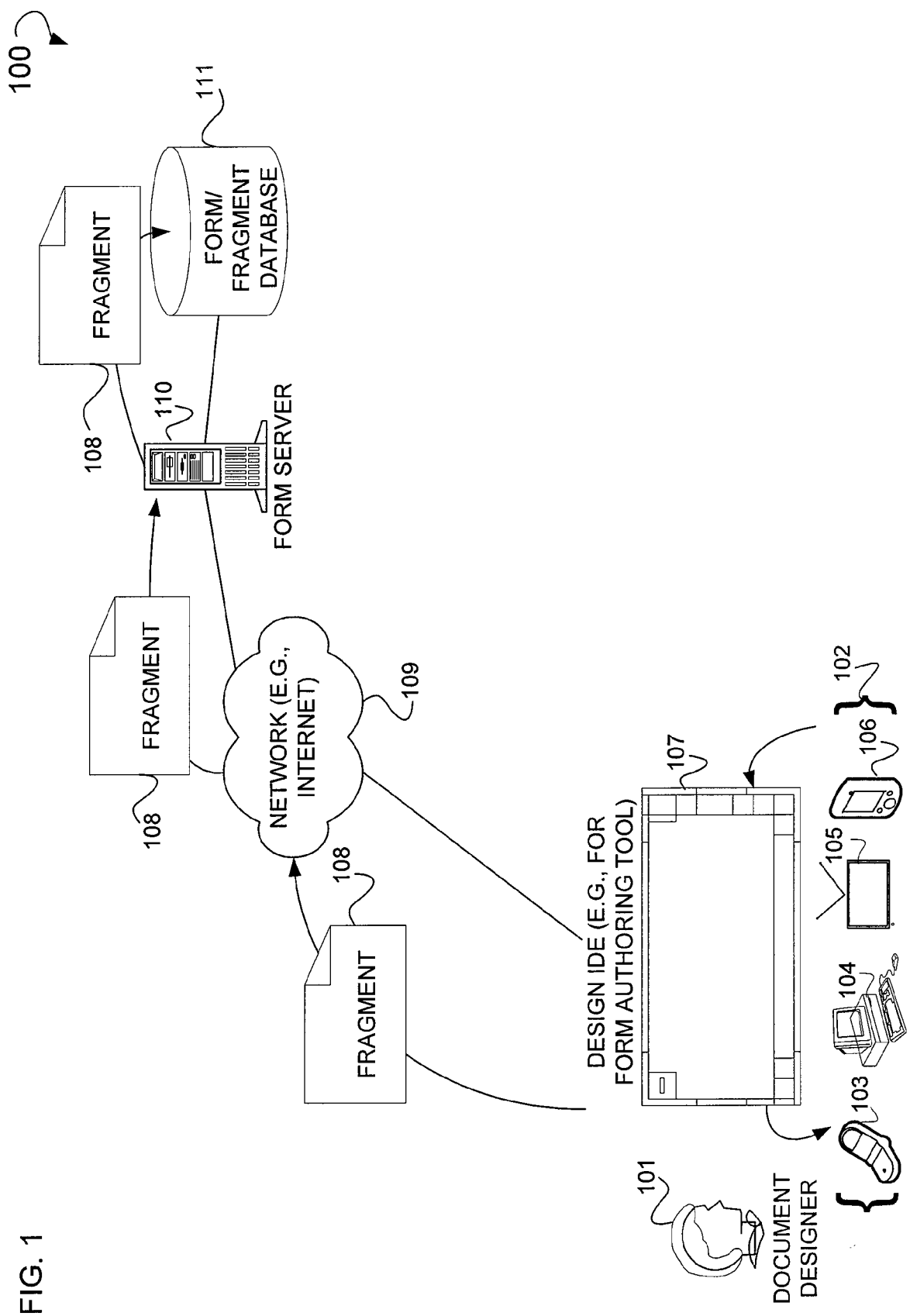
FIG. 1 is a diagram of a system, according to an example embodiment, used to generate a fragment.

In the following description, for purposes of explanation, numerous specific details are set forth in order to provide a thorough understanding of an example embodiment of the present invention. It may be evident, however, to one skilled in the art that the present invention will be practiced without these specific details.

In some example embodiments, a system and method is shown that allows for the formatting of a data field contained within a document (e.g., a final document or online form) to be determined based upon combining fragments (e.g., XFA based template fragments). During the course of combining these fragments, certain override rules (e.g., host settings) may be implemented so as to allow for property overrides to occur with regard to the fragments and the XML based properties contained therein. A property override may be a rule established by a host (e.g., a computer system) for determining whether priority should be given to a fragment, or whether priority should be given to a document in determining how to format a final document. In one example embodiment, a host specifies a property override by including a reference to the fragment in a reference tag contained within the final document.

In some example embodiments, digital content as rendered in a final document may be formatted using XFA. For example, using XFA the size of an image appearing in an online form may be determined. Additionally, using XFA one type of signature block (e.g., the data type for the signature block) for an online form may be used in lieu of another type depending on the needs of the host computer system. The size of the image or the type of signature block may be dictated by either a document itself, or by a fragment. Through the inclusion of references to fragments, a final document may be more scaleable in terms of being able to access a number of different templates that may be used to format the data fields contained within the document. If a user wants the image to only take up a specific portion of a document, a fragment can be called to dictate these formatting requirements. If a user wants to use a specific signature block, a fragment can be called to achieve this end.

In one example embodiment, a reference to a fragment is included within the document. A reference may be an attribute, syntactically represented in XML as "usehref=", and may be used to specify a fragment to be used in the formatting of a document. A fragment may have the following form:

```
<addressBlock id="adrBlock1002">
    <binding match="once" ref="shippingAddress" />
    <name/>
    <street/>
</addressBlock>
```

Here, the fragment is identified by the name "adrBlock1002", and has 3 children, one which defines two binding properties or attribute tags (e.g., match=once, and ref=shippingAddress). This fragment may then be called by, or hosted, by a document written in XML having, for example, the structure:

```
<form>
    <addressBlock usehref="library.xdp#adrBlock1002"/>
</form>
```

As illustrated above, this final document may be an online document written in XML and rendered by an application capable of interpreting XML. Such an application may include a web browser such as Microsoft Corporation's INTERNET EXPLORERT™, Mozilla Corporation's FIREFOX™, or a document reader such as Adobe Systems Incorporated ACROBAT™.

In some example embodiments, an override may be used by a host in interpreting the properties of a fragment, and the properties of a document. In cases where an override is determined by the host to be necessary, a property override may have to be implemented. An example property override is shown in the final document having the following structure:

```
<form>
    <addressBlock usehref="library.xdp#adrBlock1002">
        <binding ref="shipTo"/>
    </addressBlock>
    <addressBlock usehref="library.xdp#adrBlock1002">
        <binding ref="billTo"/>
    </addressBlock>
</form>
```

As illustrated above, while the fragment, represented as "usehref="library.xdp#adrBlock1002"", is being hosted by the document some of the fragment properties are being overridden by the document. Here, for example, ref="shippingAddress" has been overridden by ref="shipTo". Despite the over riding of ref="shippingAddress", other properties of a fragment may still be utilized. For example, the match="once" property may still be utilized. Further, <name/> and <street/> may be utilized.

In some example embodiments, the fragment and document may be generated using an online form authoring tool. This online form authoring tool may include Adobe Systems Incorporated LIVECYCLE DESIGNER™ tool. This online form authoring tool may reside as part of a form server application such as Adobe Systems Incorporated LIVECYCLE FORM SERVER™ application. In one example embodiment, the online form authoring tool is used to generate the fragment and the document. This fragment and document may then be stored by the form server for future use. In one example embodiment, the fragment is stored by the form server as an XML data packaging file (e.g., an .xdp file).

In some example embodiments, a host may request the document to be served up by the form server. In response to this request, the form server may retrieve the document, and, based upon certain references contained within the document, retrieve one or more fragments. These references may include the aforementioned "usehref=" attribute. In one example embodiment, once the fragments and the document are retrieved and assembled by the form server, they are provided to the host for viewing using an application capable of interpreting XML, XFA, or in some cases Hyper Text Markup Language (HTML). It may be the form server that resolves the override via a property override. It may be the host that resolves the override via a property override. Hosting settings may be used to resolve overrides in either embodiment. A host setting may be a user or document designer created rules set containing commands defining what properties of the document or the fragment are to be overridden. This host setting may be written in XML and retrieved on an as needed basis. Further, a host setting may be generated using a screen object or widget to generate a boolean value corresponding to a selected hosted setting or command. This boolean value may be stored for a document as part of the host settings.

In some example embodiments, an override may be resolved by comparing properties in a document data structure and a fragment data structure. The data structure may, for example, be a hierarchical data structure such as a tree. A tree may be a simple and connected acyclic graph. In one example embodiment, an override may be resolved by comparing properties in a document tree and a fragment tree. The document tree and fragment tree may be written in XML. A document tree may be composed of nodes reflecting fields, sub forms, or forms, and the contents thereof, in the form of properties relating to a document. A fragment tree may be composed of nodes reflecting fields, sub forms, or forms, and the contents thereof, in the form of properties relating to a portion of a document. Both the document tree and the fragment tree have an expected organization. For example, each specific property in either the document tree or the fragment tree has an expected location. The system and method shown herein may scan (e.g., traverse) a document tree on the host, and if the system and method finds the property (e.g., an XML tag) or associated attribute at the expected location the system and method uses that property. If the property has not been specified by the host, then the fragment is scanned. The system and method may look into the fragment tree at the expected location, and if it finds the property at that location the system and method may use it. If the property hasn't been specified in the fragment tree, then a default supplied by fragment tree is used. In some example embodiments, if the property has not been specified in the fragment tree, a default specified in an additional XML based file may be used. This XML based file may be defined according to an XFA language definition.

Example System

FIG. 1 is a diagram of an example system 100 used to generate a fragment. Shown is a document designer 101 who, utilizing a design Integrated Development Environment (IDE) 107, generates a fragment 108. This design IDE 107 may be a part of a form authoring tool. Further, this design IDE 107 may reside on any one of a number of devices 102. These devices 102 may include a cell phone 103, a computer system 104, a television or monitor 105, a Personal Digital Assistant (PDA) 106, or a smart phone (not pictured). This fragment 108 may be transmitted by the one or more devices 102 over a network 109 to be received by a form server 110. This form server 110 may store the fragment 108 into a form/fragment database 111. The form server 110 may be operatively coupled to a database server that may, in turn, be operatively coupled to the form/fragment database 110. Additionally, in some example embodiments, the form server 110 may be operatively connected to a web server such that the fragment 108 is received by the web server and the web server then transmits the fragment 108 to the form server 110 for storage into the form/fragment database 111. In some example embodiments, the fragment 108 includes XML based code that is transported over a Transmission Control Protocol/Internet Protocol (TCP/IP). In some example embodiments, a Hypertext Transfer Protocol (HTTP) or a secure Hypertext Transfer Protocol (HTTPS) is used in conjunction with the TCP/IP.

Figure 2:
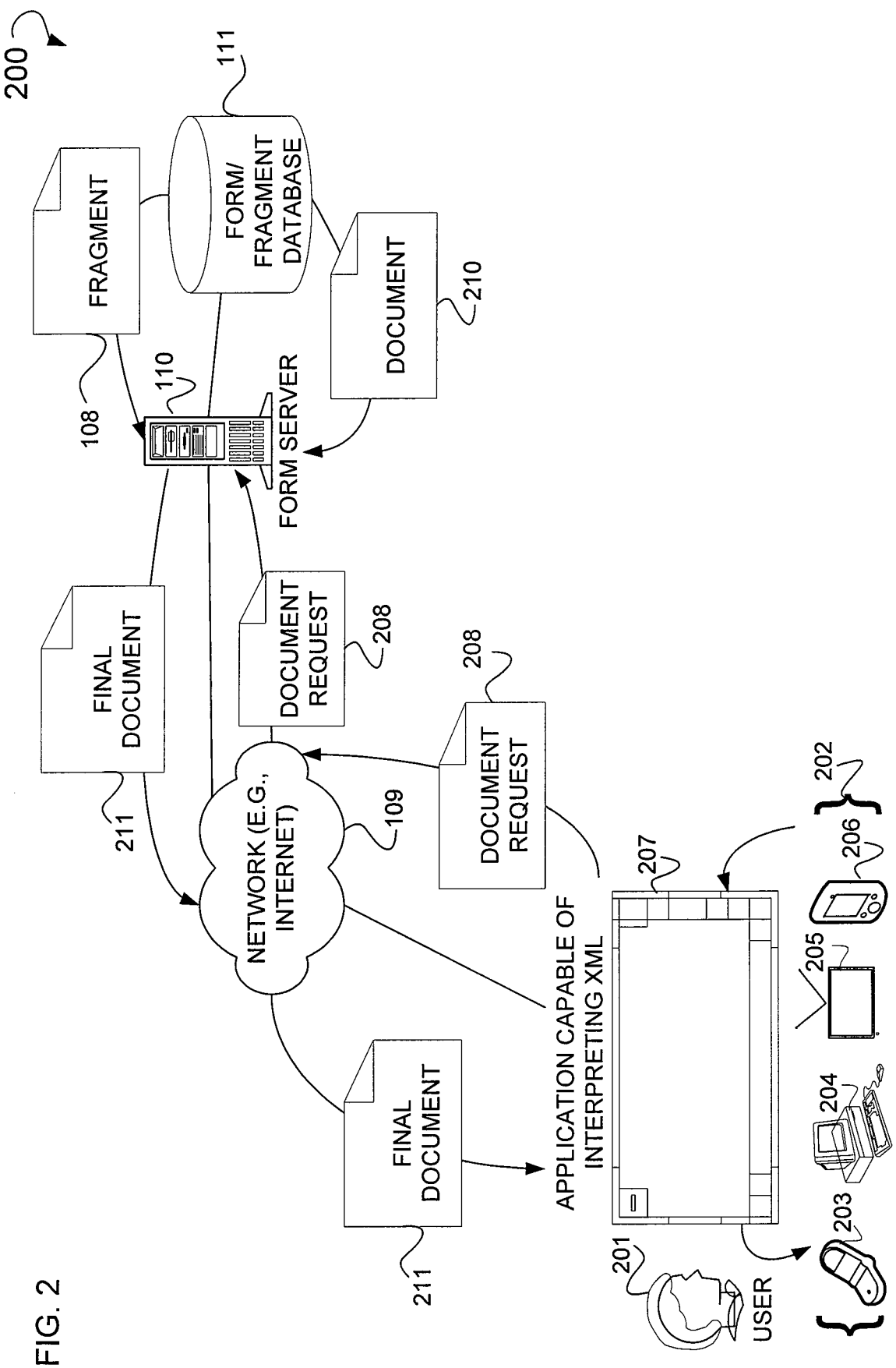
FIG. 2 is a diagram of a system, according to an example embodiment, used to generate a final document.

FIG. 2 is a diagram of example system 200 used to generate a final document. Shown is a user 201 who, utilizing an application 207, generates a document request 208. This application 207 may be capable of interpreting XML. Further, this application 207 may reside on any one of a number of devices 202. These devices 202 may include, for example, a cell phone 203, a computer system 204, a television or monitor 205, a PDA 206 or a smart phone (not pictured). These devices 202 may be hosts or host devices. The user 201 utilizing this application 207 may generate a document request 208. This document request 208 may utilize for example HTTP or HTTPS in conjunction with TCP/IP. Additionally, this document request 208 may be transmitted across the network 109 to be received by the form server 110. This form server 110 may in response to receiving document request 208, retrieve the fragment 108 and a document 210. This fragment 108 may be retrieved as, for example, an XDP file. Further, the document 210 may be retrieved as, for example, an XML based file. Once the fragment 108 and document 210 are retrieved, a form server 110 may generate a final document 211. This final document 211 may contain the fragment 108 and document 210 encoded in XML. Further, this final document 211 may be transmitted by the form server 110 across the network 109 to be received and reviewed by the user 201 utilizing the application 207.

Figure 3:
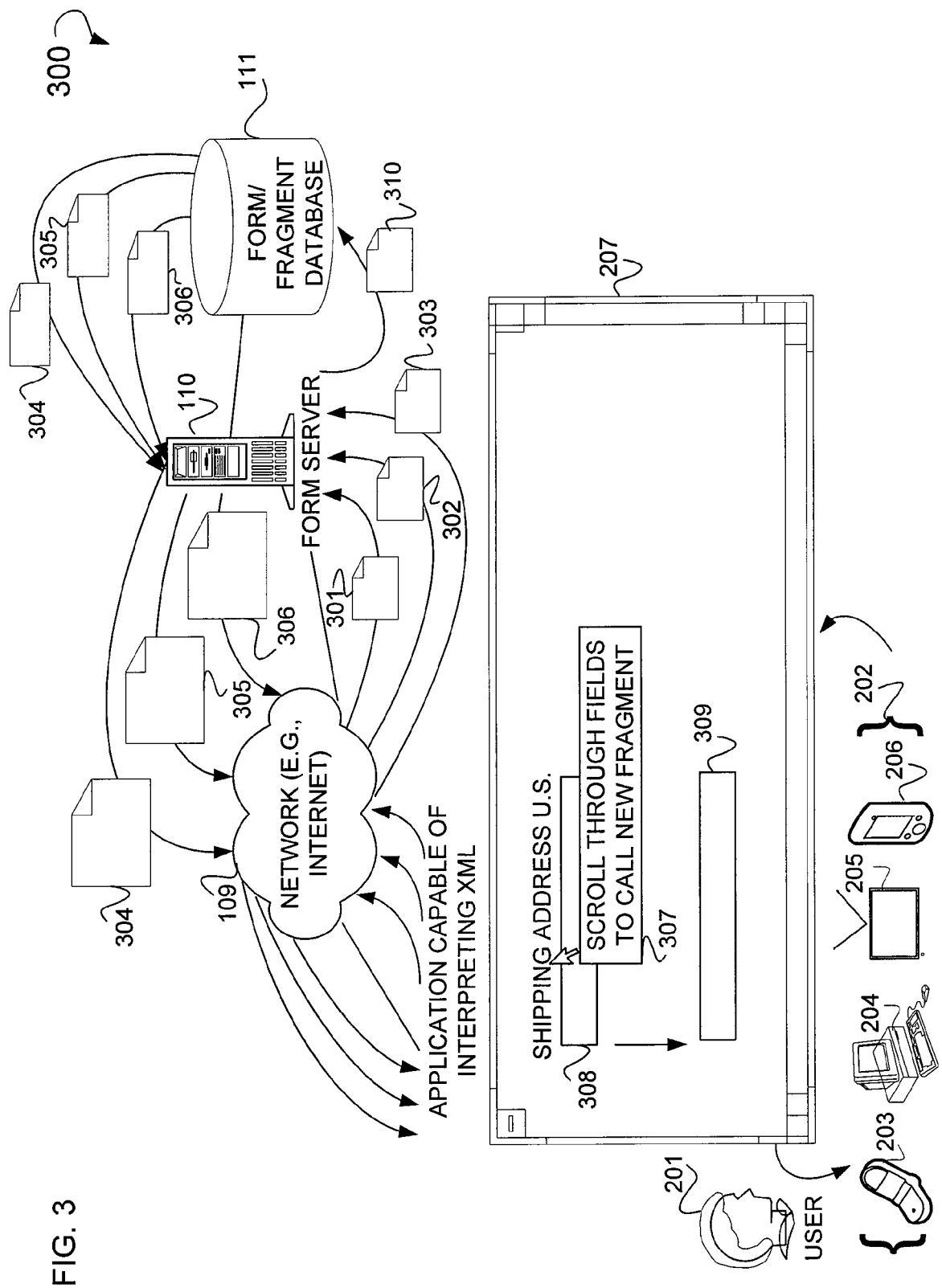
FIG. 3 is a diagram of a system, according to an example embodiment, used to dynamically request fragments.

FIG. 3 is a diagram of an example system 300 used to dynamically request fragments. In some example embodiments, fragments are dynamically requested from the form server 110, where user input is received to dynamically request a fragment. This user input may be in the form of a change of focus within an application (e.g., from one field to another), or through using some type of screen object or widget to select a fragment. In some example embodiments, a change of focus occurs within the application 207 and the final document rendered therein. The change of focus may occur where, for example, a user, such as user 201, utilizes a mouse pointer 307 to move from one rendered document field to another rendered document field within the application 207. Shown is the user 201 who, utilizing the application 207, generates fragment requests in the form of fragment requests 301, 302 and 303. Each one of these fragment requests may be generated where, for example, a change of focus occurs. This change of focus may be in the form of the user 201 utilizing a mouse pointer 307 to move from a document field 308 to a document field 309. These fragment requests 301, 302 and 303 may be transmitted across a network 109 to be received by the form server 110. The form server 110 may then make a fragment query 310 of the form/fragment database 110. In response to this fragment query 310, a fragment 304, 305 or 306 may be retrieved. This fragment may include formatting settings and field content settings. A formatting setting may be an XML based description of certain, font, spacing and other formatting characteristics relating to fields, sub forms and forms used within a document. A field content setting may be a data type description of the data to be received by, for example, a text box contained within a document. The fragments that are retrieved may be based upon the particular field receiving a focus as rendered within the application 207. The fragment request 301, 302 and 303 may be in the form of, for example, a Uniform Resource Locator (URL) corresponding to the fragment that is transmitted using, for example, HTTP or HTTPS in combination with TCP/IP. These various fragments 304, 305 and 306 may be transmitted by the form server 110 across a network 109 to be received and rendered utilizing the application 207.

Example Logic

FIG. 4 is a diagram of an example final document 400 illustrating the override of certain fragment properties. Shown is a fragment 401 written in XML and containing a number of elements and attributes. This fragment 401 may be akin to the fragment 108. For example, an element 404 is shown that identifies the fragment 401. Additionally, an attribute 405 is shown that identifies a particular property. Also, a document 402 is shown that is akin to the document 210. Contained within this document 402 is an attribute 406 and an identifier 407 that is used to identify the fragment 401 as a fragment to be called by or within the document 402. Also shown is a final document 403 that is akin to the final document 211. This final document 403 may reflect the document 402 as rendered by a host. Contained within this final document 403 is an attribute 408, wherein the property shown therein has been overridden (e.g., previously referenced attribute 405). Further, in addition to the usage of the attribute 405 within the final document 403, additional properties associated with the fragment 401 may also be overridden. Shown are the attributes 409 and 410 that have been overridden. These attributes may include, for example, a name property, a street property or any other property defined by the fragment 401.

Figure 5:
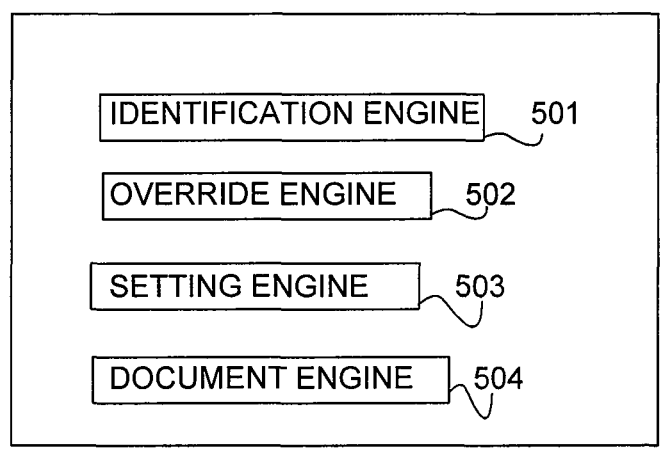
FIG. 5 is a block diagram of a computer system, according to an example embodiment, used to generate a final document.

FIG. 5 is a block diagram of a computer system 500 used to build a final document. This computer system 500 may be the one or more devices 102, form server 110, and/or the one or more devices 202. The various blocks shown herein may be implemented in software, firmware or hardware. Illustrated is an identification engine 501 to identify a host setting related to a property of a document tree and a property of a fragment tree, the document tree reflecting an organization of a document, and the fragment tree reflecting an organization of a portion of the document. Further, an override engine 502 is shown to override the property of the fragment tree using the property of the document tree, if the host setting includes a command that the property of the fragment tree is to be overridden by the property of the document tree. A setting engine 503 is also shown to determine if the host setting includes a command that the property of the fragment tree is to be overridden by the property of the document tree. Moreover, a document engine 504 may be implemented to build a document (e.g., a final document) using the property of the document tree. Additionally, this document engine 504 may be implemented to build a document (e.g., a final document) using the property of the document tree and the property of the fragment tree. In some example embodiments, the property of the document tree and the property of the fragment tree are written using XML.

Figure 6:
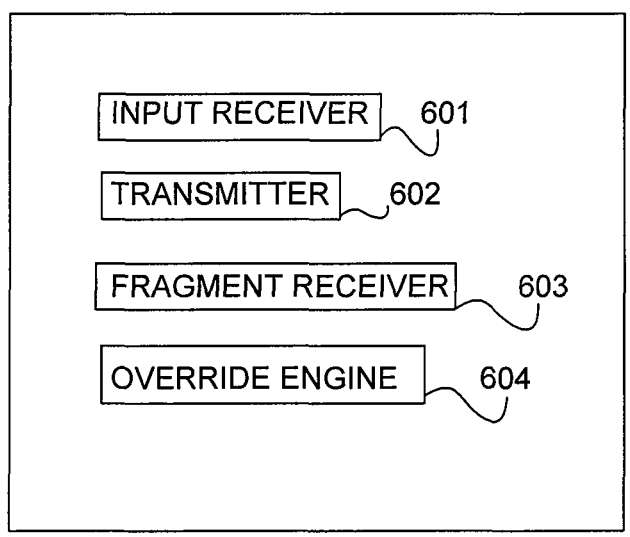
FIG. 6 is a block diagram of a computer system, according to an example embodiment, used to dynamically call fragments use to build a final document.

FIG. 6 is a block diagram of a computer system 600 used to dynamically call fragments used to build a final document. This computer system 600 may be the one or more devices 102, form server 110, and/or the one or more devices 202. The various blocks shown herein may be implemented in software, firmware or hardware. Illustrated is an input receiver 601 to receive input denoting a change in a document. A transmitter 602 is also implemented to transmit a fragment request based upon the change in the document. Moreover, a fragment receiver 603 is implemented to receive a fragment including data relating to formatting settings and field content settings for a portion of the document. In some example embodiments, the change in the document includes at least one of a change in focus from one field to another field, or a change as denoted by a screen object. Further, the field content settings include settings defining a data type for the field content. Moreover, the transmitter transmits another fragment request based upon a further change in the final document. Some example embodiments may include, the fragment being written using XML. An override engine 604 is also implemented to override at least one of the formatting settings or the field content settings, if a host setting includes a command to override at least one of the formatting settings or the field content settings.

Figure 7:
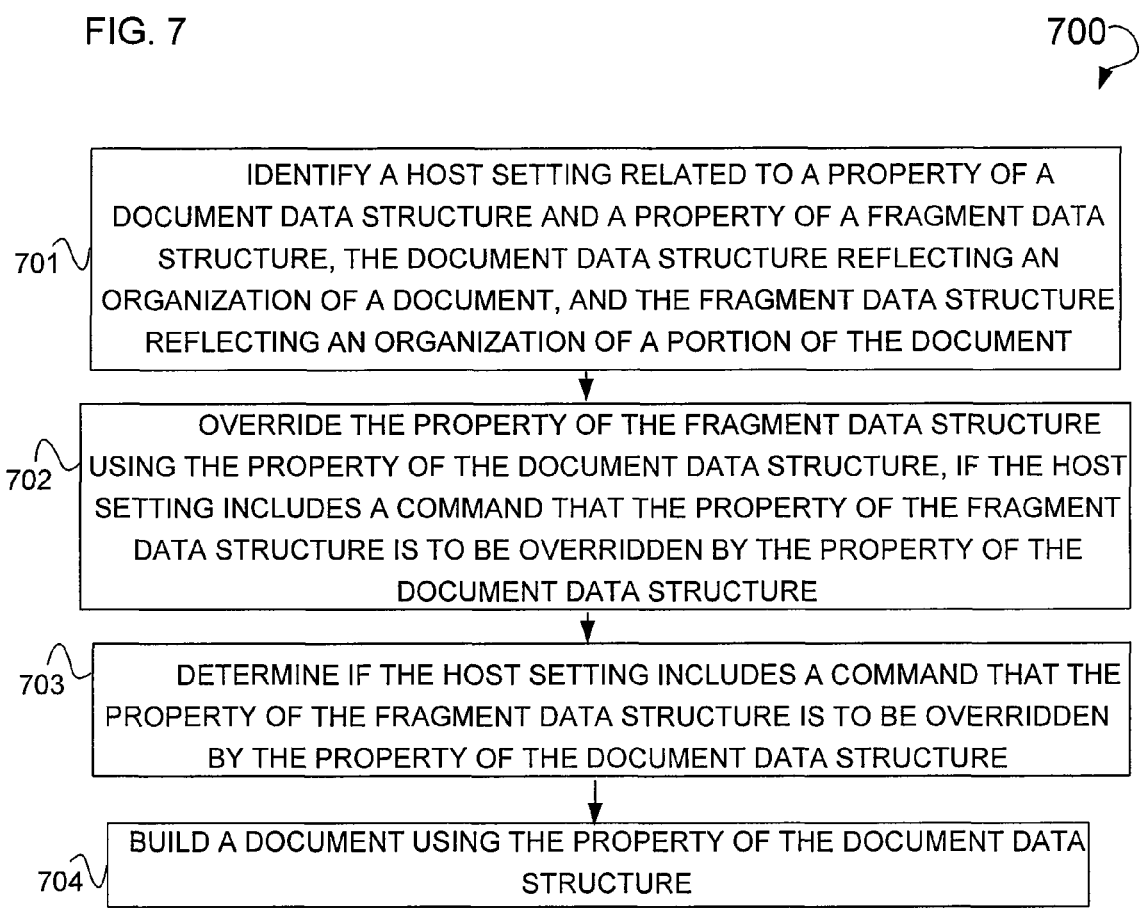
FIG. 7 is a flow chart illustrating a method, according to an example embodiment, used to generate a final document.

FIG. 7 is a flow chart showing an example method 700 used to generate a final document based upon a dynamic retrieval of fragments. Show are operations 701 through 704 that may be executed by the one or more devices 102, form server 110, and/or the one or more devices 202. Illustrated is an operation 701 that, when executed, identifies a host setting related to a property of a document tree and a property of a fragment tree, the document tree reflecting an organization of a final document, and the fragment tree reflecting an organization of a portion of the final document. An operation 702 is also illustrated that, when executed, overrides the property of the fragment tree using the property of the document tree, if the host setting includes a command that the property of the fragment tree is to be overridden by the property of the document tree. An operation 703 is also shown that, when executed, determines if the host setting includes a command that the property of the fragment tree is to be overridden by the property of the document tree. Operation 704 may be executed to build a document (e.g., a final document) using the property of the document tree. This operation 704 may also be used to build a document (e.g., a final document) using the property of the document tree and the property of the fragment tree. In some example embodiments, the property of the document tree and the property of the fragment tree are written using XML.

Figure 8:
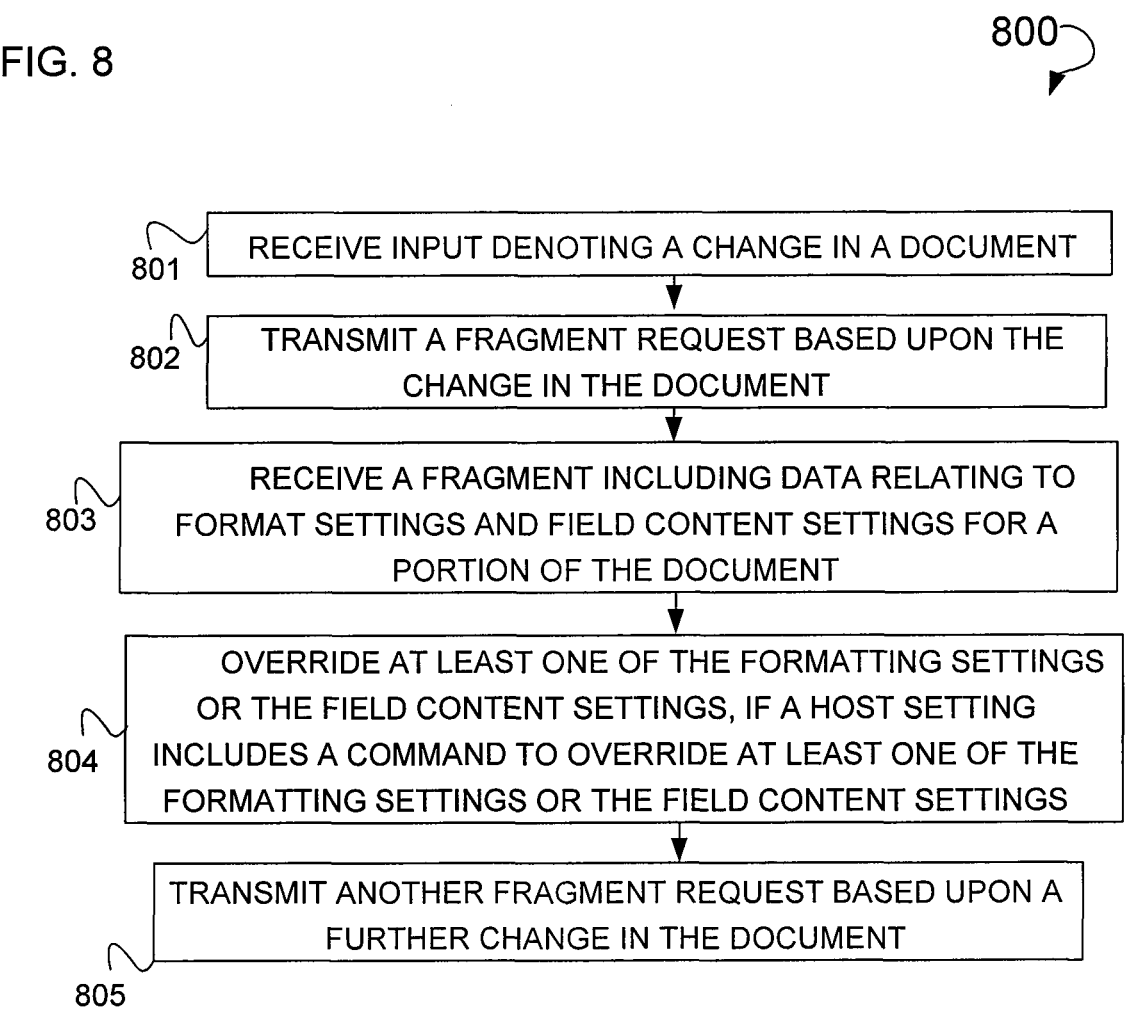
FIG. 8 is a flow chart showing a method, according to an example embodiment, used to generate a final document based upon the dynamic retrieval of fragments.

FIG. 8 is a flow chart showing an example method 800 used to generate a final document based upon dynamic retrieval of fragments. Show are operations 801 through 805 that may be executed by the one or more devices 102, form server 110, and/or the one or more devices 202. Illustrated is an operation 801 that, when executed, receives input denoting a change in a document or final document. An operation 802 is shown that, when executed, transmits a fragment request based upon the change in the document or final document. Further, operation 803 is shown that, when executed, receives a fragment including data relating to formatting settings and field content settings for a portion of the document, or final document. In some example embodiments, the change in the document includes at least one of a change in focus from one field to another field, or a change as denoted by a screen object. Further, the field content settings may include settings defining a data type for the field content. An operation 804 may be executed to override at least one of the format settings of the field content settings, if a host setting includes a command to override at least one of the formatting settings or field content settings. Operation 805 is shown that may be executed to transmit another fragment request based upon a further change in the document. In some example embodiments, the fragment is written using XML.

Figure 9:
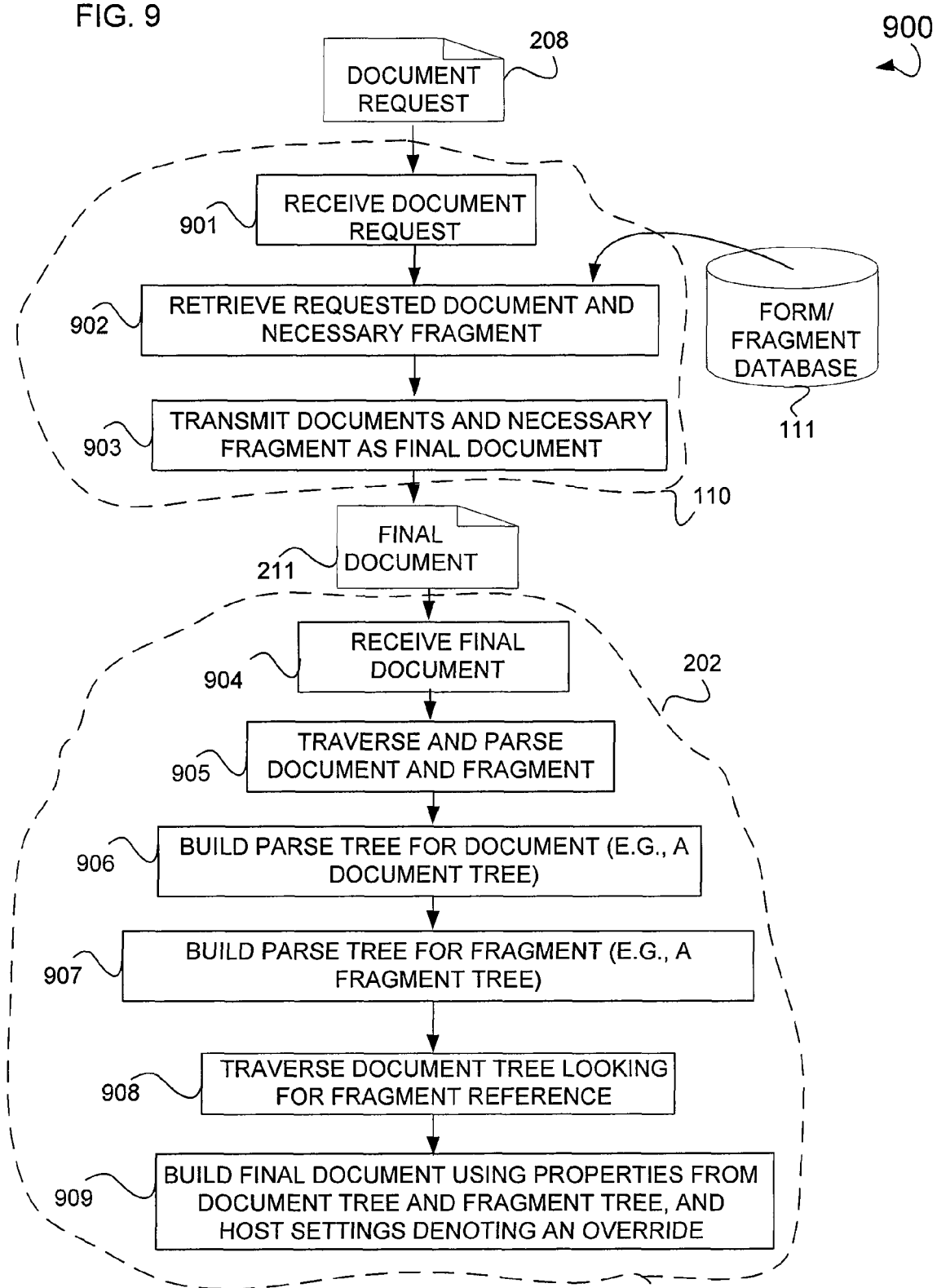
FIG. 9 is a flowchart illustrating a method, according to an example embodiment, used to build a final document.

FIG. 9 is a flowchart illustrating an example method 900 used to build a final document. Illustrated are a number of operations 901 through 903 that may reside on, for example, the form server 110. Also shown are a number of operations 904 through 909 that may reside on the one or more devices 202. Illustrated is a document request 208 that is received through the execution of an operation 901. An operation 902 is executed to retrieve the requested document and associated fragments, from a form/fragment database 111. These fragments may be retrieved based upon whether or not they are called or otherwise referenced within the requested document. An operation 903 is shown that transmits the document and necessary fragment as a final document 211. This operation 903 may utilize, for example, a TCP/IP protocol for the purposes of transmitting the final document 211. An operation 904 may be executed that may receive the final document 211. Further, an operation 905 may be executed that may traverse and parse the final document 211 and fragment contained therein. An operation 906 may be executed that may build a parse tree from the document (e.g., a document tree). This document tree may be built through applying certain principles as outlined in the Document Object Model (DOM). Further, an operation 907 may be executed that may build a parse tree for the fragment (e.g., a fragment tree). In some example embodiments, the document tree and fragment tree may be built using certain grammars as defined in an XML Schema Definition (XSD), or a Document Type Definition (DTD). An operation 908 may be executed that may traverse the document tree looking a fragment reference (e.g., "usehref=") contained therein. Further, an operation 909 may be executed that may build a final document using properties from the document tree and fragment tree in addition to certain host settings. These host settings may be utilized to determine whether the properties of the fragment are to be overridden in the final document. These properties may appear within the document tree and the fragment tree.

Figure 10:
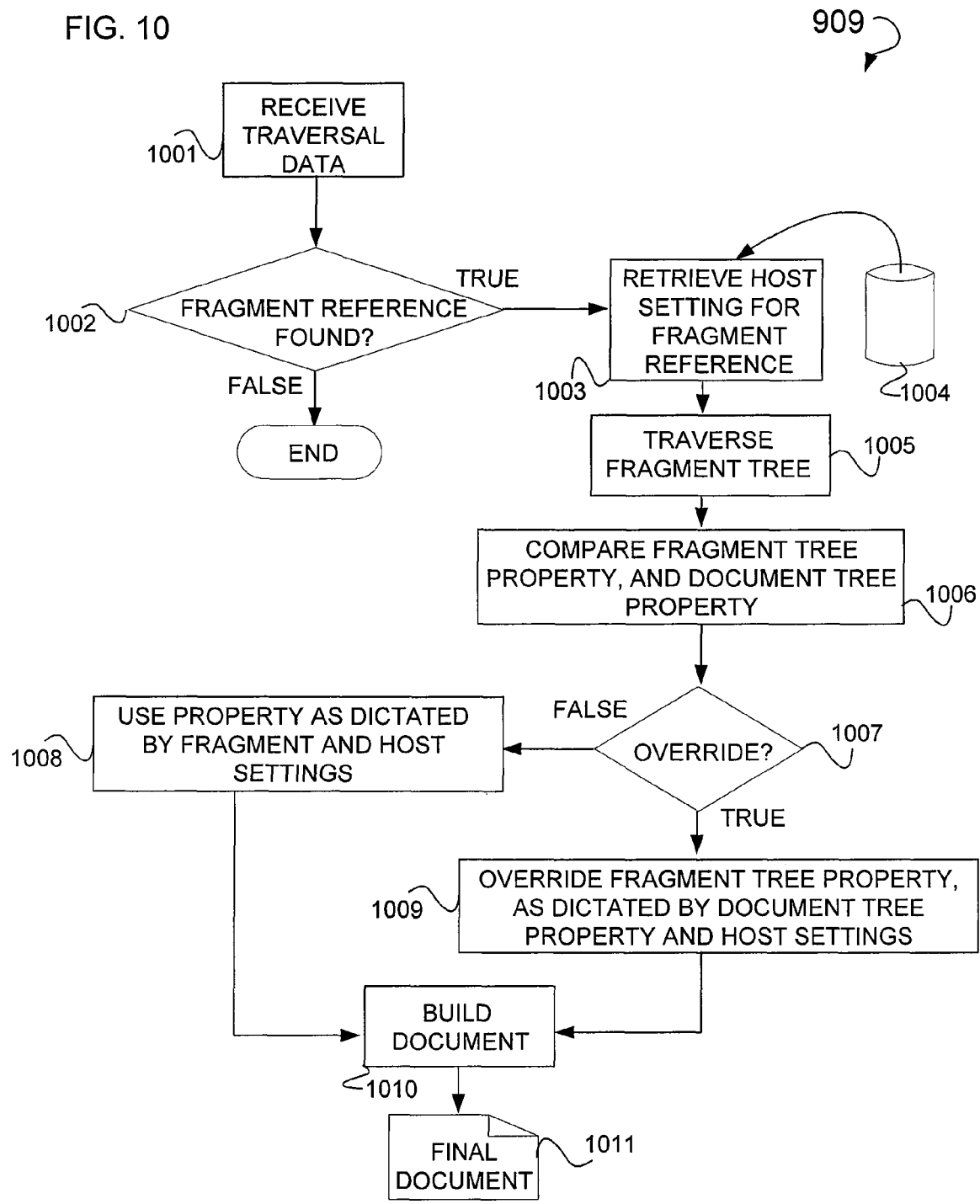
FIG. 10 is a flowchart illustrating the execution of an operation, according to an example embodiment, that may build a final document using properties from the document tree and fragment tree in addition to certain host settings.

FIG. 10 is a flowchart illustrating the execution of operation 909. Shown is an operation 1001 that receives traversal data. This traversal data may be generated through traversing the document tree, and extracting various references (e.g., XML based tags) contained therein. A decisional operation 1002 may be executed that determines whether or not a fragment reference (e.g., an attribute syntactically represented as "usehref=") has been found within the document tree. In cases where a decisional operation 1002 evaluates to "false," a termination condition is met. In cases where a decisional operation 1002 evaluates to "true," an operation 1003 may be executed that retrieves a host setting for a fragment reference from, for example, a database 1004. An operation 1005 may be executed that may traverse a fragment tree containing various references (e.g., XML base tags). Further, an operation 1006 may be executed that compares a fragment tree property associated with a reference, and a document tree property associated with a reference. A decisional operation 1007 may be executed that determines whether or not to override the fragment tree property with the document tree property through overriding an attribute of the fragment as displayed within the document. In cases where a decisional operation 1007 evaluates to "false," an operation 1008 is executed that may utilize a property as dictated by the host setting and fragment. Specifically, the property in the fragment tree may be utilized by the final document. In cases where decisional operation 1007 evaluates to "true," an operation 1009 is executed. Operation 1009 may facilitate the overriding of the fragment tree property where this override is dictated by the document tree property and the host setting. Specifically, in cases where decisional operation 1007 evaluates to "true," and an override is implemented based upon host settings and a property of the document tree be used to generate the document. Where operations 1008 or 1009 are executed, an operation 1010 is executed that builds a document where this document may be, for example, a final document 1011. This final document 1011 may be the same as final document 211, or distinct in cases where fragment attributes are utilized.

Figure 11:
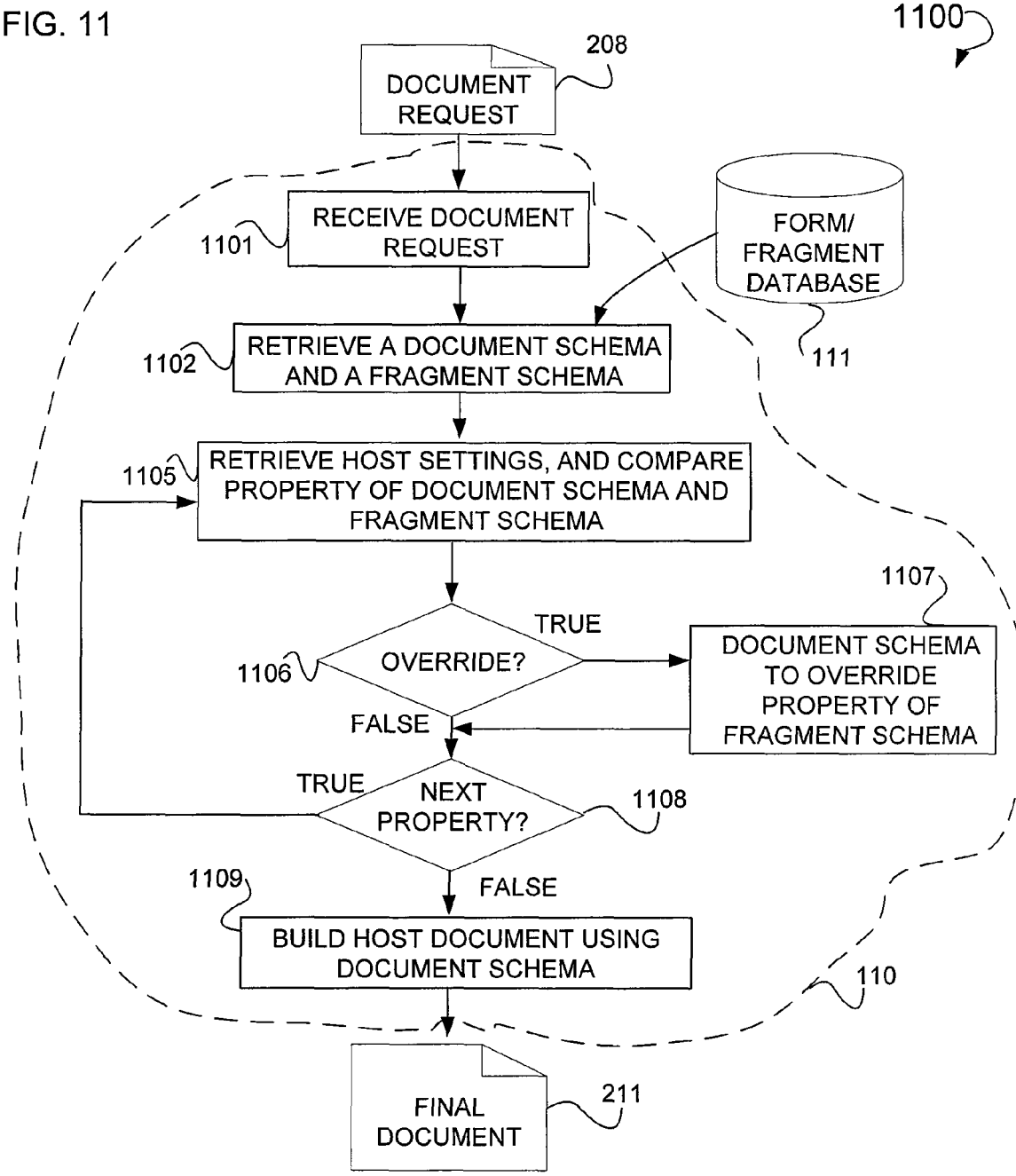
FIG. 11 is a flowchart illustrating the execution of a method, according to an example embodiment, used to override a fragment schema utilizing a document schema in the generation of a final document.

FIG. 11 is a flowchart illustrating the execution of an example method 1100 used to override a fragment schema utilizing a document schema in the generation of a final document. The document schema and host schema may be XSDs or DTDs. Shown are various operations 1101, 1102, 1105, 1106, 1107, 1108 and 1109 that may reside on the form server 110. In some example embodiments, the document request 208 is received through the execution of operation 1101. An operation 1102 is executed that may retrieve a document schema and a fragment schema from the form/fragment database 111. An operation 1105 may be executed that may retrieve host settings or a host setting from the one or more devices 202, and compare the properties of the document schema and fragment schema. A decisional operation 1106 may then be executed to determine whether to override the properties of the fragment schema using the document schema. The override of the fragment schema property may be permanent in some example cases. In cases where decisional operation 1106 evaluates to "true," an operation 1107 may be executed. Operation 1107, when executed, may utilize the document schema property to override the fragment schema property. In cases where decisional operation 1106 evaluates to "false," a decisional operation 1108 may be executed that determines whether or not a next property exists within the document schema. In cases where decisional operation 1108 evaluates to "true," the previously shown operation 1105 is executed. In cases where decisional operation 1108 evaluates to "false," an operation 1109 is executed. This operation 1109 may build a final document using the document schema such that a final document 211 may be generated.

Figure 12:
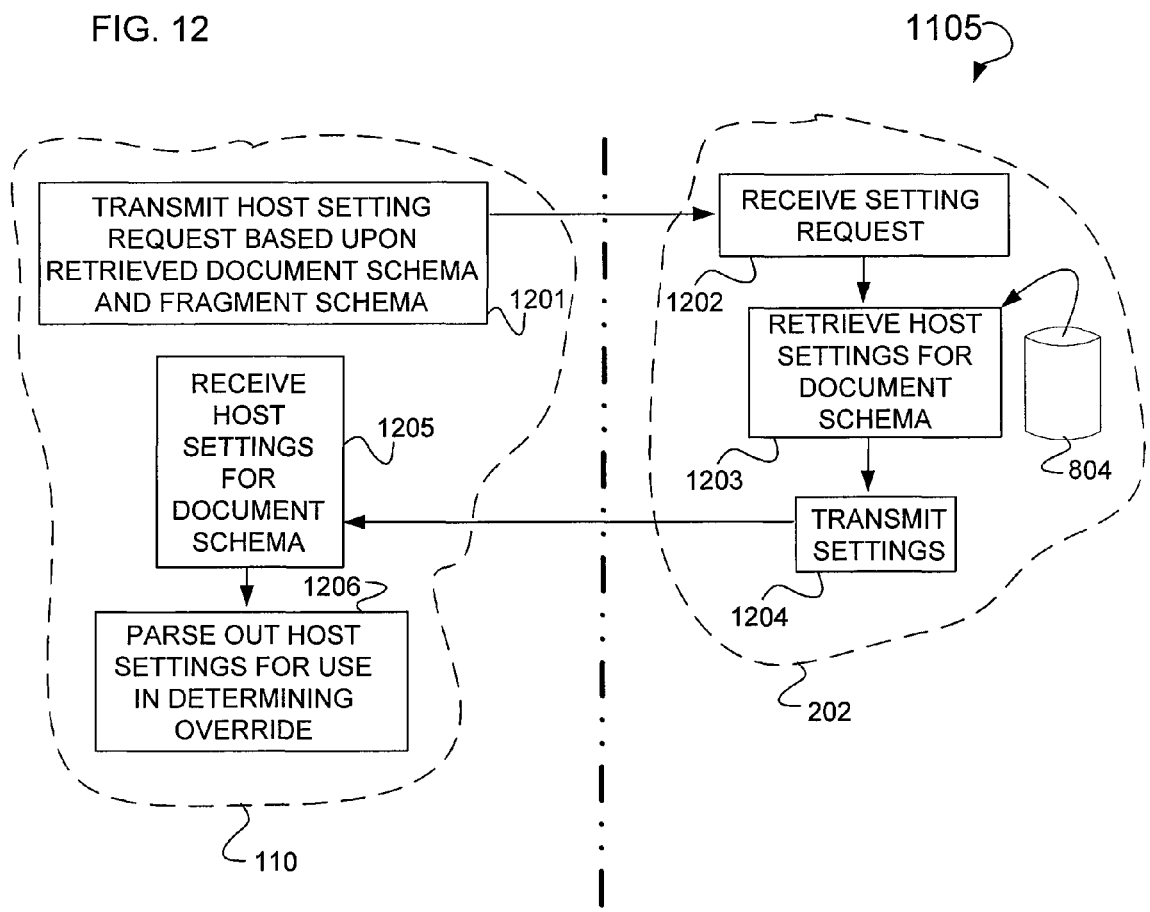
FIG. 12 is a dual stream flowchart illustrating the execution of an operation, according to an example embodiment, that may retrieve host settings or a host setting from the one or more devices, and compare the properties of a document schema and a fragment schema.

FIG. 12 is a dual stream flowchart illustrating the execution of operation 1105. Shown is an operation 1201, 1205 and 1206 that may reside as a part of the form server 110. Additionally shown is operation 1202, 1203 and 1204 that may reside as a part of, for example, the devices 202. In some example embodiments, the operation 1201 is executed to transmit a host setting request based upon a retrieved document schema and fragment schema. An operation 1202 may be executed that may receive this host setting request. An operation 1203 may be executed that retrieves the host settings for a document schema from the database 804. An operation 1204 may be executed that may transmit these settings to be received to the execution of operation 1205. An operation 1206 may be executed that parses out the host settings for use in determining the existence of an override. These properties may be XML tags and properties associated with these tags.

Figure 13:
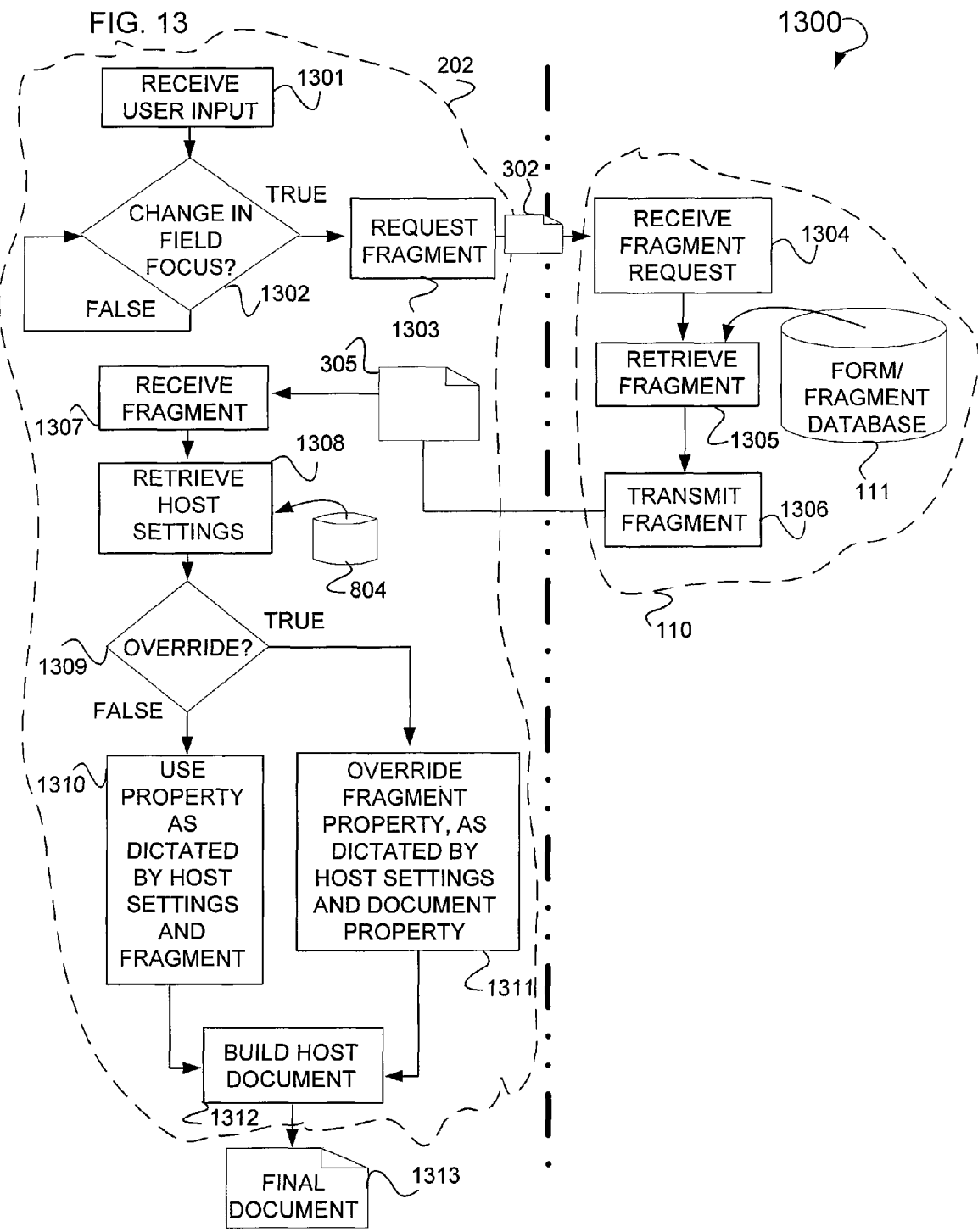
FIG. 13 is a dual stream flowchart illustrating the generation of a final document, according to an example embodiment, utilizing dynamically requested fragments.

FIG. 13 is a dual stream flowchart illustrating the generation of a final document utilizing dynamically requested fragment schemas. Shown are operations 1301, 1302, 1303, 1307, 1308, 1309, 1310, 1311 and 1312. These various operations may reside on, for example, the devices 202. Also shown are operations 1304 through 1306, where these various operations reside on, for example, the form server 110. In some example embodiments, an operation 1301 is executed that may receive user input. This user input may be in the form of input generated by an input device such as, for example, a mouse, light pen, keyboard, touch screen, or other suitable device. This user input may denote a change of focus from one field appearing within a rendered final document, to another field appearing within a rendered final document. This rendered final document may be rendered by, for example, the application 207. A decisional operation 1302 may be executed that may determine whether a change in a field focus has occurred. In cases where decisional operation 1302 evaluates to "false," decisional operation 1302 is re-executed. In cases where decisional operation 1302 evaluates to "true," an operation 1303 is executed that generates a fragment request such as fragment request 302. In some example embodiments, a screen object or widget may be used to denote a change from one field to another field appearing in a final document. This screen object or widget may be a check box, radio button, or other suitable screen object or widget. This fragment request is then received through the execution of operation 1304. An operation 1305 may be executed that retrieves the fragment requested (see e.g., the fragment request 302) from the form/fragment database 111. An operation 1306 may be executed that may transmit a fragment (e.g., the fragment 305) to be received through the execution of operation of 1307. An operation 1308 may be executed that may retrieve a host setting from a database 804. A decisional operation 1309 may be executed that determines whether or not to override a fragment property in the final document. In cases where decisional operation 1309 evaluates to "true," an operation 1311 may be executed that may override a fragment property where the override is dictated by a document property and the host setting. In cases where decisional operation 1309 evaluates to "false," an operation 1310 may be executed that may use the fragment property as dictated by the host setting. In cases where operations 1310 and 1311 are executed, an operation 1312 may be executed that may build a final document such as final document 1313.

Example Database

Some embodiments may include the various databases (e.g., 111, 804, or 1004) being relational databases, or, in some cases, OLAP—based databases. In the case of relational databases, various tables of data are created and data is inserted into and/or selected from these tables using a Structured Query Language (SQL) or some other database-query language known in the art. In the case of OLAP databases, one or more multi-dimensional cubes or hyper cubes, containing multidimensional data from which data is selected from or inserted into using a Multidimensional Expression (MDX) language, may be implemented. In the case of a database using tables and SQL, a database application such as, for example, MYSQL™, MICROSOFT SQL SERVER™, ORACLE 8I™, 10G™, or some other suitable database application may be used to manage the data. In this, the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. The tables or cubes made up of tables, in the case of, for example, ROLAP, are organized into an RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization, or optimization algorithm known in the art.

Figure 14:
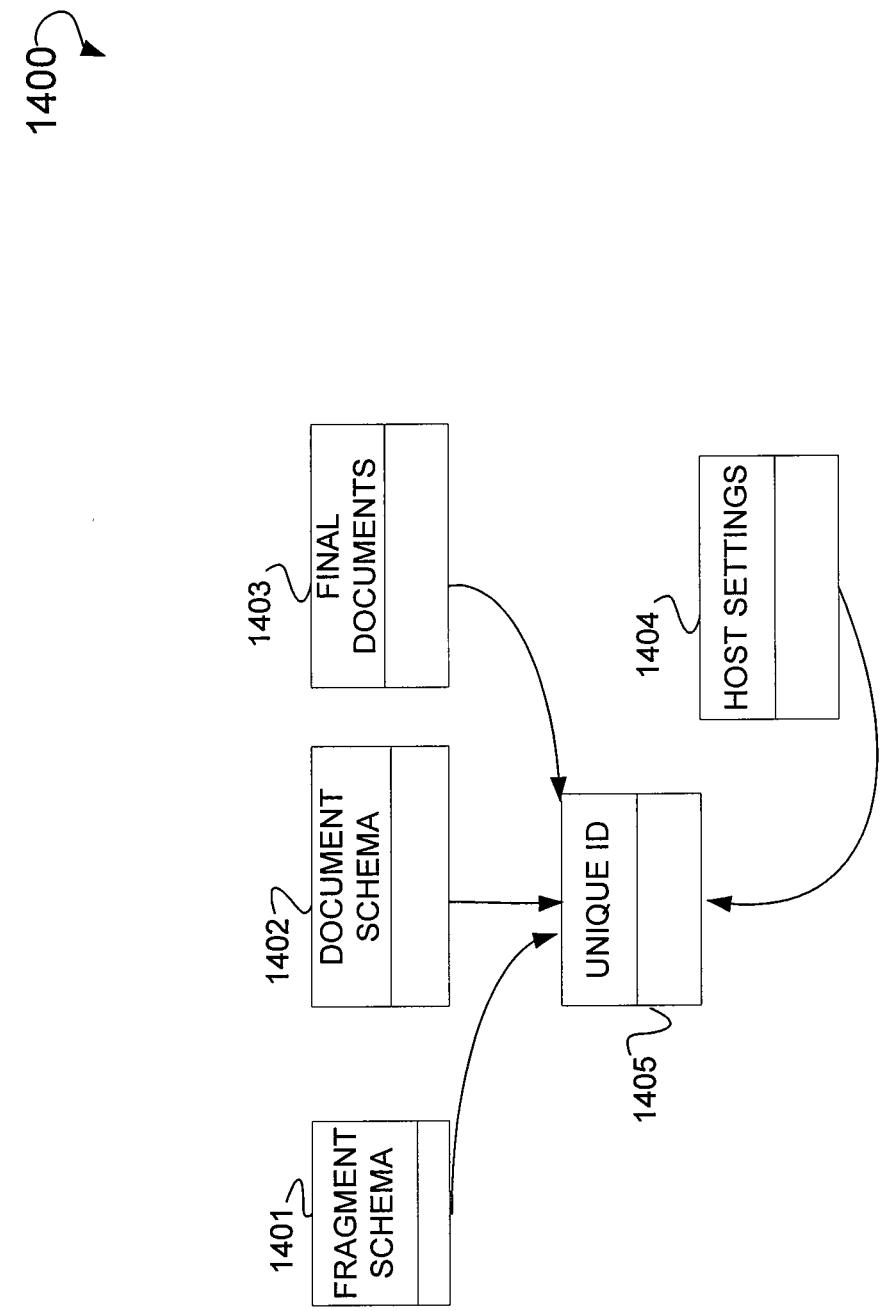
FIG. 14 is a Relational Data Schema (RDS), according to an example embodiment, illustrating various data tables used by the system and method shown herein.

FIG. 14 is an example RDS 1400 illustrating various data tables used by the system and method shown herein. Illustrated is a table 1401 containing a fragment schema. An XML data type, a string data type, or other suitable data type may be used within this table 1401. Also shown is a table 1402 containing a document schema data. An XML data type, a string data type, or other suitable data type may be utilized by this table 1402. Also shown is a table 1403 containing final documents. An XML data type, a string data type, or other suitable data type may be utilized by this table 1403. Also shown is a table 1404 containing host settings in the form of a user or document designer created rules set. An XML data type, a string data type, an integer type, a boolean data type, or suitable data type may be utilized by this table 1404 to store the user or document designer created rules set. A table 1405 may be utilized to contain unique identifiers to uniquely identify the data contained in each of the tables 1401 through 1404. An integer string, or other suitable data type may be utilized by the table 1405.

Component Design

Some example embodiments may include the above-illustrated operations being written as one or more software components. These components, and the functionality associated with each, may be used by client, server, or peer computer systems. These various components can be implemented into the system on an as-needed basis. These components may be written in an object-oriented computer language such that a component oriented or object-oriented programming technique can be implemented using a Visual Component Library (VCL), Component Library for Cross Platform (CLX), Java Beans (JB), Enterprise Java Beans (EJB), Component Object Model (COM), or Distributed Component Object Model (DCOM)), or other suitable technique. These components are linked to other components via various Application Programming Interfaces (APIs) and then compiled into one complete server and/or client application. The method for using components in the building of client and server applications is well known in the art. Further, these components may be linked together via various distributed programming protocols as distributed computing components.

Distributed Computing Components and Protocols

Some example embodiments may include remote procedure calls being used to implement one or more of the above-illustrated components across a distributed programming environment. For example, a logic level may reside on a first computer system that is located remotely from a second computer system containing an interface level (e.g., a GUI). These first and second computer systems can be configured in a server-client, peer-to-peer, or some other configuration. The various levels can be written using the above-illustrated component design principles and can be written in the same programming language or in different programming languages. Various protocols may be implemented to enable these various levels and the components contained therein to communicate regardless of the programming language used to write these components. For example, an operation written in C++ using Common Object Request Broker Architecture (CORBA) or Simple Object Access Protocol (SOAP) can communicate with another remote module written in Java™. Suitable protocols include SOAP, CORBA, and other protocols well-known in the art.

A System of Transmission Between a Server and Client

Some embodiments may utilize the Open Systems Interconnection (OSI) model or TCP/IP protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology) or structures.

A Computer System

FIG. 15 shows a diagrammatic representation of a machine in the example form of a computer system 1500 that executes a set of instructions to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a PC, a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 1500 includes a processor 1502 (e.g., a CPU, a Graphics Processing Unit (GPU) or both), a main memory 1501, and a static memory 1506, which communicate with each other via a bus 1508. The computer system 1500 may further include a video display unit 1510 (e.g., a Liquid Crystal Display (LCD) or a Cathode Ray Tube (CRT)). The computer system 1500 also includes an alpha-numeric input device 1517 (e.g., a keyboard), a UI cursor controller 1511 (e.g., a mouse), a drive unit 1516, a signal generation device 1515 (e.g., a speaker) and a network interface device (e.g., a transmitter) 1520.

The disk drive unit 1516 includes a machine-readable medium 1522 on which is stored one or more sets of instructions and data structures (e.g., software) 1521 embodying or used by any one or more of the methodologies or functions illustrated herein. The software instructions 1521 may also reside, completely or at least partially, within the main memory 1501 and/or within the processor 1502 during execution thereof by the computer system 1500, the main memory 1501 and the processor 1502 also constituting machine-readable media.

The instructions 1521 may further be transmitted or received over a network 1526 via the network interface device 1520 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies illustrated herein. The term "machine-readable medium" shall accordingly be taken to include, but not be limited to, solid-state memories, optical and magnetic media, and carrier wave signals.

Market Place Applications

In some example embodiments, a system and method is shown that allows a host to determine whether or not to use a fragment in the generation of a final document. In some cases, this final document may be an online document. Further, this determination may be based upon a determination as to whether a property of a fragment is to be overridden. These properties may be written as XML based attributes or tags. A host may generate a host setting to facilitate a determination as to whether to use a fragment or host in the generation of a final document.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method comprising:
    identifying a host setting related to a property of a document data structure and a property of a fragment data structure, the document data structure reflecting an organization of a document that includes a reference to the fragment data structure separate from the document, and the fragment data structure reflecting an organization of a portion of the document;
    retrieving the fragment data structure that is separate from the document; and
    overriding the property of the fragment data structure using the property of the document data structure, if the host setting includes a command that the property of the fragment data structure is to be overridden by the property of the document data structure.

2. The computer implemented method of claim 1, further comprising determining if the host setting includes a command that the property of the fragment data structure is to be overridden by the property of the document data structure.

3. The computer implemented method of claim 1, further comprising building a final document using the property of the document data structure.

4. The computer implemented method of claim 1, further comprising building the document using the property of the document data structure and the property of the fragment data structure.

5. The computer implemented method of claim 1, wherein the property of the document data structure and the property of the fragment data structure are written using an eXtensible Markup Language (XML).

6. The computer implemented method of claim 1, wherein at least one of the document data structure, or the fragment data structure is a tree.

7. A computer implemented method comprising:
    receiving input denoting a change in a document that includes a reference to a fragment separate from the document;
    transmitting a fragment request based upon the change in the document; and
    receiving the fragment including data relating to formatting settings and field content settings for a portion of the document; and
    overriding at least one of the formatting settings or the field content settings, if a host setting includes a command to override at least one of the formatting settings or the field content settings.

8. The computer implemented method of claim 7, wherein the change in the document includes at least one of a change in focus from one field to another field, or a change as denoted by a screen object.

9. The computer implemented method of claim 7, wherein the field content settings include settings defining a data type for the field content.

10. The computer implemented method claim 7, further comprising transmitting another fragment request based upon a further change in the document.

11. The computer implemented method of claim 7, wherein the fragment is written using an eXtensible Markup Language (XML).

12. A non-transitory, machine-readable medium comprising instructions, which when implemented by one or more machines, cause the one or more machines to perform the following operations:
    identify a host setting related to a property of a document data structure and a property of a fragment data structure, the document data structure reflecting an organization of a document that includes a reference to the fragment data structure separate from the document, and the fragment data structure reflecting an organization of a portion of the document;
    retrieve the fragment data structure that is separate from the document; and
    override the property of the fragment data structure using the property of the document data structure, if the host setting includes a command that the property of the fragment data structure is to be overridden by the property of the document data structure.

* * * * *